April 25, 1933. C. H. WHITE 1,905,022
MIDDLE BURSTER
Filed Nov. 12, 1930 4 Sheets-Sheet 4
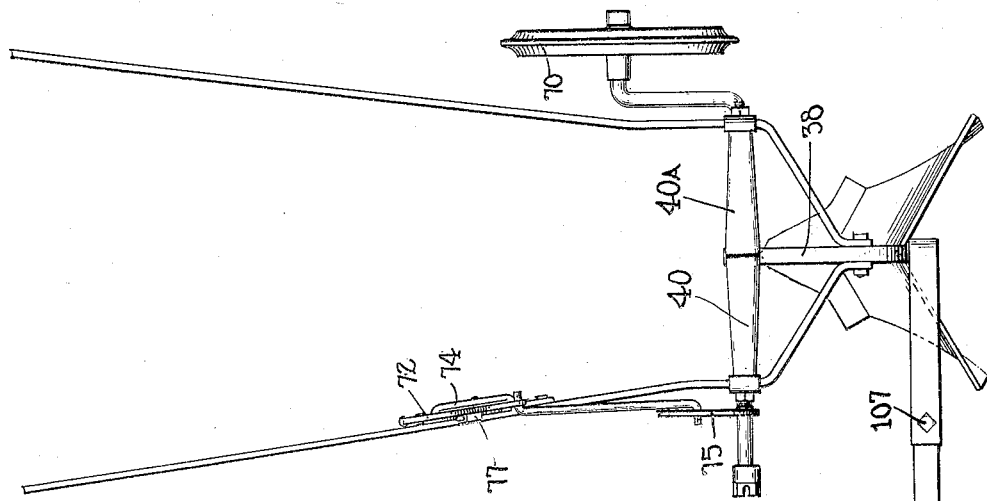
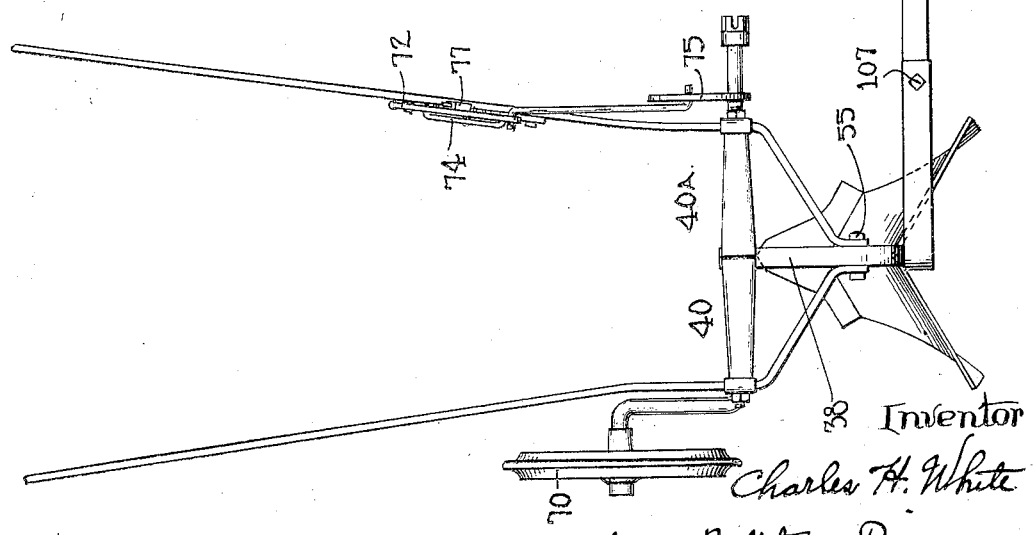

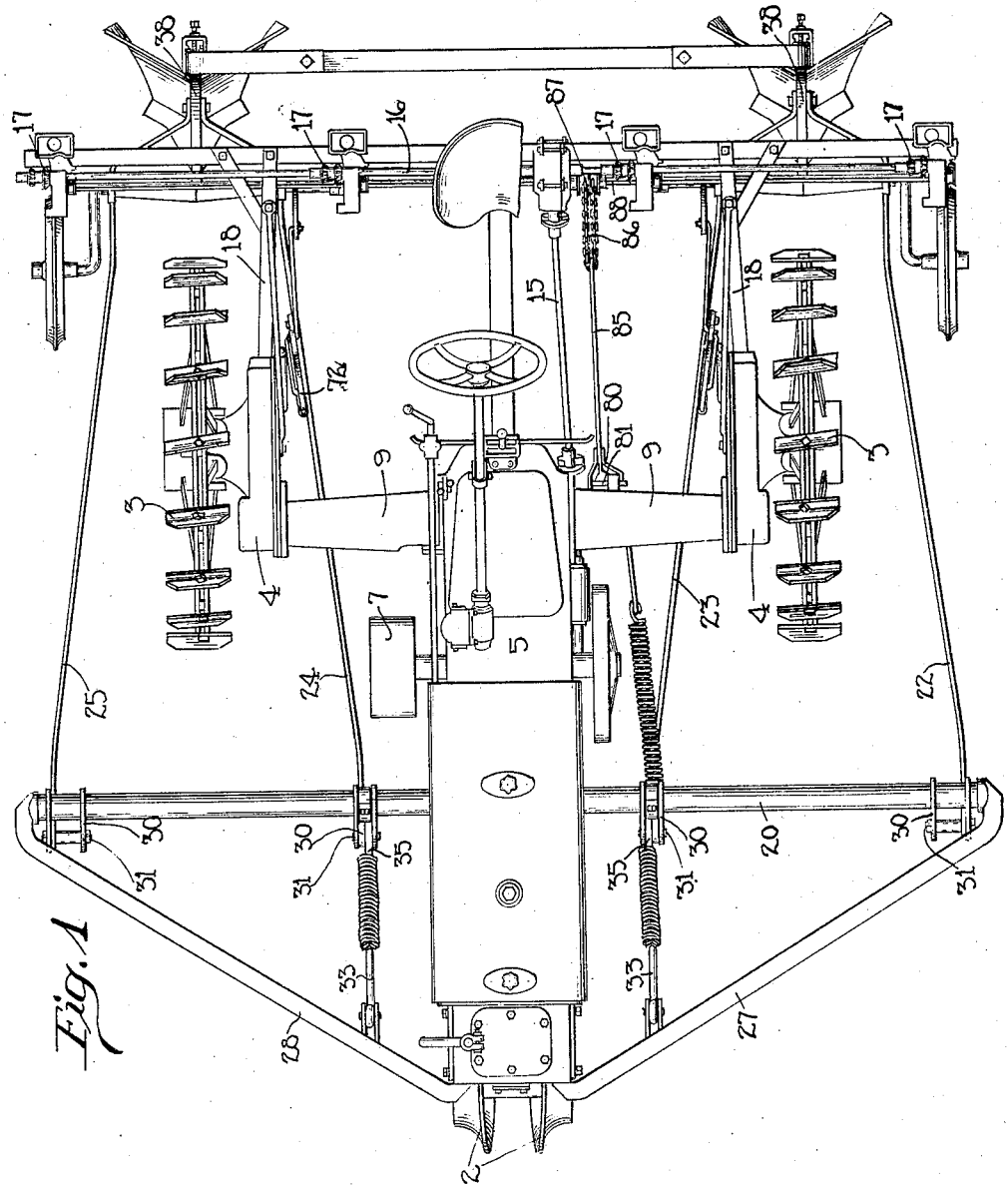

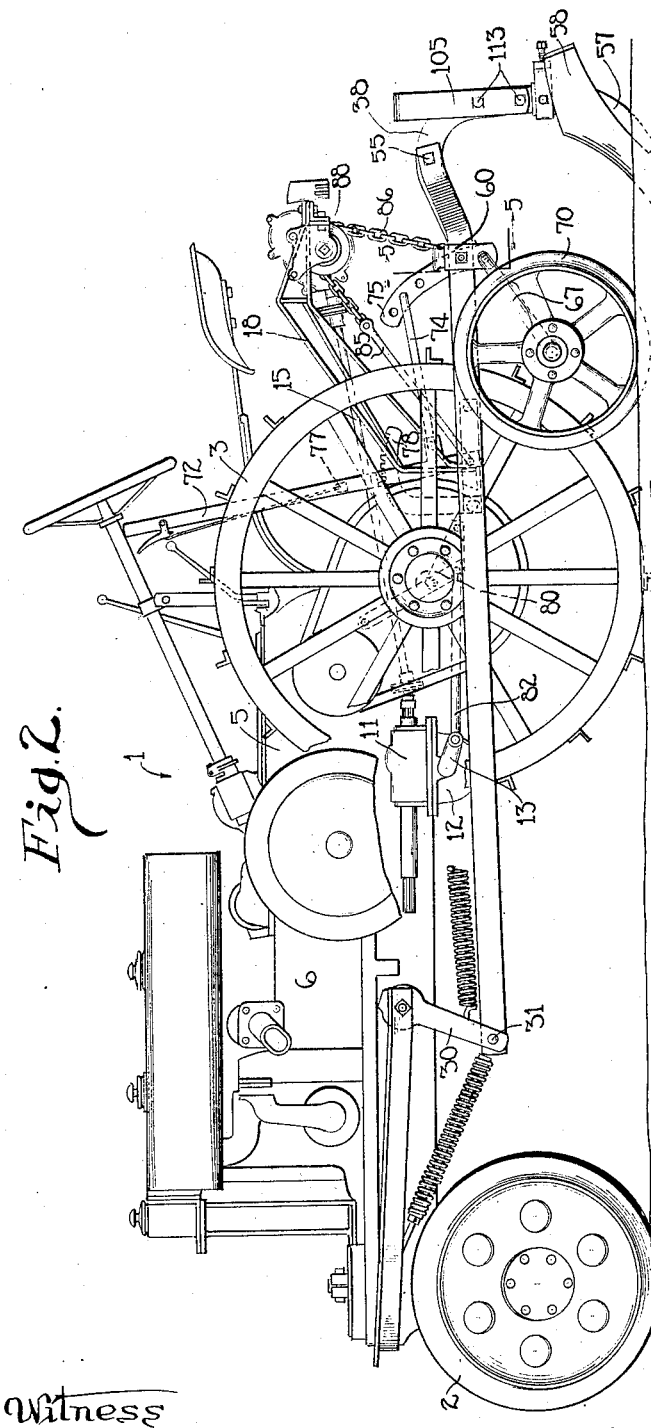

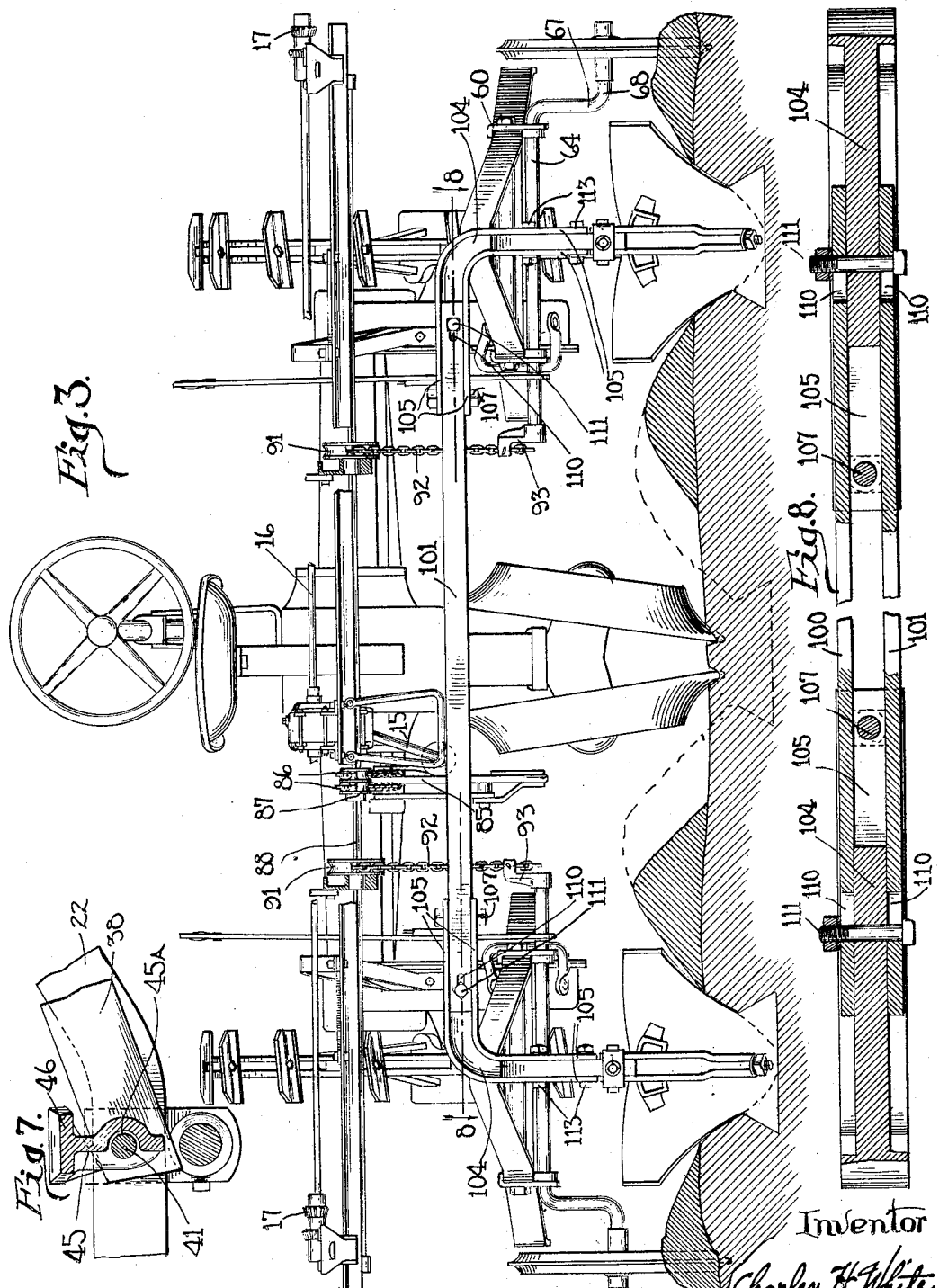

Patented Apr. 25, 1933

1,905,022

UNITED STATES PATENT OFFICE

CHARLES H. WHITE, OF MOLINE, ILLINOIS, ASSIGNOR TO DEERE & COMPANY, OF MOLINE, ILLINOIS, A CORPORATION OF ILLINOIS

MIDDLE BURSTER

Application filed November 12, 1930. Serial No. 495,045.

The present invention relates generally to agricultural implements and more particularly to the type of implement where earth working tools are attached directly to a tractor to be propelled thereby, and when so attached the plows or other earth working tools and the tractor functions as a unitary power operated implement.

More specifically, my invention is concerned with the provision of an improved implement of the above described type where only two furrows are made simultaneously, the earth working tools throwing the soil to either side of each furrow, this operation being commonly known as listing.

In certain parts of the corn and cotton country for which my implement has been particularly designed, it is the usual procedure to go over the field to be prepared and form ridges and furrows therein. Sometime later and before the planting operation, the old ridges are split by a middle burster, thus forming new ridges where the furrows were and furrows where the ridges were. This second ridging operation is sometimes known as re-listing. Because of climatic conditions in certain sections of the corn and cotton country it is essential to maintain the ground in a loose, non-packed condition on the top of the ridges made during either or both of the listing operations. So far as I am aware, few if any of the implements of the prior art are so constructed as to permit the newly formed ridges to remain in a loose condition, many of the implements of the prior art being so arranged that one or more of the supporting wheels run on the ridges just after they were formed. Unless this condition is compensated for in some way it frequently occurs in certain sections of the country that a poor stand is obtained on account of the packing of the loose soil in the ridges by the implement as it passes back and forth across the field.

The principal object, therefore, of my invention is the provision of a lister or middle burster wherein the soil tilling tools are so positioned with respect to the tractor that neither the front nor the rear wheels of a tractor ever need run on a ridge formed by the tools. As a result, the soil is maintained in a loose, non-packed condition on the top of the ridges which, as indicated above, is very desirable, particularly in certain parts of the country.

Another object of my invention which is of considerable importance is the provision of improved means for attaching the soil tilling tools to the tractor whereby each of the tools is positioned directly back of one of the rear or driving wheels of a tractor, and this improved means may take the form of two rearwardly converging means for each of the soil tilling tools, which means is preferably positioned on opposite sides of each rear wheel and embracing the same. This particular form of construction is especially adapted to provide an implement which is strong and sturdy and which is inexpensive to manufacture and assemble because of the simple construction and fewer parts.

A still further object of my invention is the provision of improved means for attaching each of the soil tilling tools to the corresponding pair of tool beams, which construction is particularly adapted to withstand the stresses and strains incident during the normal life and operation of such a machine. The particular construction I provide is strong yet relatively light and is especially formed as to permit easy attachment and removal of the soil tilling tools when and if their removal is necessary.

In addition, another object of my invention is to provide a lister or middle burster construction which is adapted to be easily substituted for some of the lister attachments in use at the present time, particularly those of the four-row type where it has been found that under extremely difficult operations the customary tractor may be overloaded.

A still further object of my invention is the provision of improved and simplified structure for gauging the operating depth of the soil tilling tools and also the provision of improved means for raising and lowering the tools to and from operative soil tilling position. In the preferred embodiment illustrated the gauging and lifting means are combined, producing thereby a simpler and less expensive construction.

Other objects and advantages of my invention will be apparent to those skilled in the art after a consideration of the following detailed description taken in conjunction with the accompanying drawings wherein one preferred embodiment of my invention is illustrated and in which:

Figure 1 is a top plan view showing the tractor and earth-working units in operative position;

Figure 2 is an elevational view, on a somewhat larger scale than Figure 1, and showing the soil tilling tools in ground-working position;

Figure 3 is a rear view of the implement illustrated in Figure 2 and on a still larger scale so as to clearly show how the ridges and furrows are formed and maintained in loose un-packed condition;

Figure 4 is a view of the lister attachment removed from the tractor, the forward ends of the pairs of soil tilling tool beams being omitted;

Figure 5 is an enlarged detail view taken substantially on the line 5—5 of Figure 2;

Figure 6 is a view looking to the right in Figure 5;

Figure 7 is a cross section taken substantially on the line 7—7 of Figure 5; and Figure 8 is an enlarged cross section taken substantially along the line 8—8 of Figure 3.

Referring now to the drawings, 1 indicates the tractor having front wheels 2, rear driving wheels 3, chain housings 4 therefor, and a transmission and gear case 5, forming substantially a frame for the tractor. As shown in Figure 1, the front steering wheels 2 are preferably disposed close together to track substantially in a line midway between the relatively widely spaced rear driving wheels 3. Power is transmitted from the motor 6 to a clutch and pulley construction 7, see Figure 1, and to the transmission and drive gears within the frame housing 5, and thence through a drive shaft journaled within the tubular housing extensions 9, to the chain drive contained within the chain housings 4.

The tractor is also provided with a power take-off mechanism indicated by the reference numeral 11 and which also includes a power lift 12 which embodies a half revolution clutch mechanism driven from the transmission gears or from some other driven part of the tractor. A power lift crank arm 13 is operated by the half revolution clutch to swing in a fore and aft extending vertical plane, the power lift crank arm being locked at the end of each half revolution.

The power take-off mechanism 11 is connected by means of a longitudinally extending power shaft 15 to a transverse seed feeding shaft 16 having gears 17 thereon for driving connection with seed planting mechanism (not shown). The transverse drive shaft 16 and the seed feeding mechanism is mounted upon rearwardly extending detachable brackets 18 bolted or otherwise secured to the chain housings 4.

Preferably intermediate the front and rear wheels of the tractor is a draft connection in the form of a draft bar 20 extending laterally on each side of the tractor a sufficient distance to effect coupling with the tool beams 22, 23, 24 and 25. The draft bar 20 is rotatably supported in bearings formed in the forward portion of the tractor frame. The draft bar 20 is also journaled in the outer ends of diagonal brace bars 27 and 28, the inner ends of which are formed for attachment to the front end of a tractor, as best shown in Figure 1. The draft bar 20 is preferably of heavy pipe stock, and may be formed of one or more sections, as desired.

The forward ends of the tool beams 22, 23, 24 and 25, or draft beams as they are sometimes called, are connected to the draft bar 20 by means of downwardly depending spaced arms 30 arranged in pairs and rigidly secured to the draft bar 20, as by welding. Extending between the lower ends of each pair of arms 30 is a releasable coupling pin 31 on which the front end of the associated tool or draft beam is pivotally mounted. The two inner pairs of arms 30 are yieldingly retained in their forward position, see Figure 2, by means of an apertured link 33, pivoted at its forward end to the diagonal braces 27 and 28, and at its rear end to a heavy spring 34, the latter being pivoted to the pin 31 by means of a link 35, best shown in Figure 1.

Each pair of the two pairs of tool or draft beams 22, 23, 24 and 25 converge rearwardly and at the rear thereof the beams of each pair lie on opposite sides of the rear tractor wheel. Rearwardly of the tractor wheels, the beams of each pair converge at a greater angle and are clamped to the front end of a stub beam 38 by means of two castings 40 and 40ª and a long bolt 41.

As best shown in Figures 5 and 7, the castings 40 and 40ª comprise web portions 45 stiffened by means of flanges 46 and 47, the flange 46 extending along the top of the casting while the flange 47 is formed at an angle to the flange 46 so as to extend substantially downward and lie in a vertical plane.

The castings 40 and 40ª are conformed with a greater vertical dimension at one end than the other end having the flange 47. The ends opposite the flanges 47 are provided with strengthening flanges 50, the upper part of these flanges adapted to meet one another at a slight angle of inclination while the lower portions of these flanges are notched, as at 51, for the reception of the stub beam 38 therebetween, as best shown in Figure 5. The bolt 41 is threaded at both ends and is adapted to pass through holes in the beams 22 and 23 as well as through holes formed in the flanged ends 47 and a hole in the forward end of the stub beam 38, whereby when the bolt 41 is tightened, as by nuts 53, the castings 40 and 40ª, the stub beam 38 and the draft beams 22 and 23 are rigidly and securely clamped together. The more sharply converging rear ends of the tool or draft beams 22 and 23 are formed so as to lie adjacent the stub beam 38 as in Figure 2 and they are secured to the stub beam 38 by means of a bolt 55. The web portions 45 of the castings 40 and 40ª are offset longitudinally thereof to provide a semicircular recess 45ª to accommodate the bolt 41, as best shown in Figure 7. The stub beams 38 are each formed with a curve or goose neck 57 to which is attached a soil tilling tool 58 of usual type, preferably a lister plow bottom or any other soil turning tool for disposing the soil on either side thereof.

Brackets 60 in the form of angles having a portion 61 adapted to engage over the top of the beams 22 and 23, as best shown in Figure 5, have a depending apertured portion 62 for the reception of a crank axle 64 journaled therein. Collars 65 are mounted on the crank axle 64 and secured thereto, as by a set screw 66, so as to be adjacent the angles 60 to thereby hold the crank axle 64 in its transverse position.

The crank axle 64 extends at either end beyond the beams 22 and 23 and at one end, preferably the outer end, a crank portion 67 is formed so as to provide a spindle 68 on which is journaled the gauge wheel 70. It will be noted from Figure 2 that the crank portion 67 of the crank axle 64 extends downwardly and forwardly so as to bring the gauge wheel 70 substantially alongside the rear wheel 3. It will also be observed that rocking the crank axle 64 will serve to adjust the operating depth of the soil tilling tool 58.

Each of the crank axles 64 are adapted to be rocked to adjust the operating depth of the plow bottoms 58 by means of a hand lever 72, one mounted on each of the inner beams 23 and 24 as best shown in Figure 4, and connected by means of a link 74 to an upwardly and forwardly extending arm 75 rigidly secured, as by welding, to the inner end of the crank axle 64, see Figure 5. The arm 75 is provided with a number of apertures for receiving the rear end of the link 74 in any one of a number of selected positions whereby the range of the depth adjusting means may be varied. The hand lever 72 has the usual latch and sector mechanism 77, the sector 78 of which is secured to the inner beam of each pair.

In an implement of this type it is desirable to be able to raise and lower the soil tilling tools by means of the power of a tractor motor. In order to provide means to this end I connect the swinging power lift crank arm of the tractor to a swinging link 80 pivoted at its upper end to the tractor, as at 81 in Figure 1, by means of a link or rod 82. The lower end of the swinging link 80 is connected by means of a link 85 which is connected at its end with the loop of a chain 86 trained over and secured to a double sheave 87. The double sheave 87 is mounted on a transversely extending lifting shaft 88 which carries at either side of the tractor a lifting sheave 91, best shown in Figure 3.

Connected with each lifting sheave 91 and windable thereon is a lifting chain 92 adjustably secured at its lower end to a small bracket 93, see Figure 5. The bracket 93 is formed at one end with a curved slot to receive one of the links of the chain 92, the walls of the slot 95 being apertured to allow the pin 96 to pass therethrough and through one of the links of the chain 92. The pin 96 may be in the form of cotter key which is removable so that the vertical position of the bracket 93 on the chain 92 may be adjusted at will. At its lower end the bracket 92 is journaled for limited rotation on the innermost end of the crank axle 64, as best shown in Figure 5. The limited rotation is preferably obtained by virtue of a radial slot 97 formed in the hub portion of the bracket 93 and a pin 98 secured in the slot 97 and on the inner end of the crank axle 64. The slot 97 permits the bracket 93 to assume a vertical position irrespective of the particular depth adjustment of the gauge wheel 70.

The two stub beams 38 are rigidly fastened together by means of two bars 100 and 101. These bars are clamped on opposite sides of angle members 103. Each angle member is in the form of an I-beam section having ends turned at right angles to one another and the web portion 104 interrupted to allow the flanges 105 to extend beyond the web portion 104 at both legs of the angle. The horizontal portion of the flanges 105 are adapted to be clamped, as by bolts 107, to the two bars 100 and 101, while the bars themselves are provided with slots 110. Bolts 111 are passed through these slots 110 through an opening formed in the horizontal portion of the web 104 of each of the angle members 103. Thus by tightening the bolts 107 and 111, these two bars 100 and 101 and the angle members 103 are securely and rigidly secured together. The vertical portions of the flanges 105 are adapted to embrace and be bolted to the stub beams 38, as by bolts 113.

The gauge wheels 70 are positioned as close to the furrow opening tool 58 as is possible, being positioned just far enough away from the outer beams 22 and 25 to provide clearance. As a result, each furrow opening tool 58 is gauged by its own gauge wheel and is substantially not affected by the other gauge wheel.

The operation of an implement embodying my invention is believed to be obvious from the above description. When going over the field for the first time the operator preferably opens up alternate furrows, that is, furrows Nos. 1 and 3 going up the field and furrows Nos. 5 and 7 on the return trip. After he has completed this operation he cuts out the remaining furrows, that is, furrows 2 and 4 going up the field and furrows 6 and 8 returning, and so on. The spacing of the rear wheels is such that in cutting out the furrows as mentioned above the front wheels run in one of the previously formed furrows while the rear wheels with the furrow openers directly behind run midway between the previously formed furrows.

Each of the soil tilling tools or furrow openers is adjusted for depth by the corresponding hand lever 72, which rocks the crank axle 64 through the link 74 to position the gauge wheel 70 vertically relatively to the beams 22 and 23 or 24 and 25 and the stub beam 38. When the end of a row is reached the operator merely trips the power lift clutch mechanism which is effective to swing the power lift crank arm 13 forwardly, through the link 85 and the lifting chain 86 lifts upwardly on the inner end of the crank axle 64 on each side of the tractor, thereby raising the soil tilling tools from engagement with the ground. When the implement is turned around and ready to start again, all the operator has to do is to again trip the power lift clutch mechanism thereby causing the power lift crank arm 13 to swing rearwardly, completing a full revolution, which restores the parts to the position shown in Figure 2.

The re-listing or middle bursting operation is performed substantially in the same manner as an original furrow opening operation described above. During the re-listing the old ridges are split and the soil deposited in the old furrows, thus forming furrows where the ridges were and ridges where the old furrows were. Like the first operation, in re-listing the operator cuts out every other furrow first and then goes over the field again, cutting out the remaining furrows, the only difference between the re-listing operation and the first operation is that in the re-listing operation the front and rear wheels run on the tops of the old ridges and the gauge wheels run in the old furrows, whereas in the first operation the front and rear wheels as well as the gauge wheels all run on the original ground surface. It will be seen, however, that as far as the gauge wheels are concerned it is immaterial whether the tools are gauged from the original ground surface or from the bottom of the old furrows since both surfaces are undisturbed ground in that at no time does either the front or rear wheels or the gauging wheels run on the freshly turned soil.

While I have described in connection with the accompanying drawings one preferred embodiment of my invention, it is to be understood that my invention is not to be limited to the specific structure shown and described, but that, in fact, widely different means may be employed in the practice of the broader aspects of my invention.

What I claim, therefore, and desire to secure by Letters Patent is:

1. The combination with a tractor including front and rear wheels, of an implement attachment comprising a transverse draft bar detachably connected with the tractor forward of the rear wheels thereof, a plurality of beams extending longitudinally of the tractor and attached to said bar, earth-working devices on said beams directly behind said rear wheels, and power lift mechanism for raising and lowering the beams.

2. The combination with a tractor including front and rear wheels, of an implement attachment comprising a plurality of beams extending generally longitudinally of the tractor, plowing means on said beams directly behind said rear wheels, and yieldable hitch means connecting the front portions of said beams with the forward portion of the tractor.

3. The combination with a tractor including front and rear wheels, of an implement attachment comprising a plurality of beams extending substantially longitudinally of the tractor and forwardly of the rear wheels thereof and disposed on both sides of said rear wheels, and earth-working devices on said beams directly behind said rear tractor wheels.

4. The combination with a tractor including front and rear wheels, of an implement attachment comprising a plurality of beams extending substantially longitudinally of the tractor and disposed on both sides of said rear traction wheels, earth-working devices on said beams directly behind said rear tractor wheels, and gauge wheels connected to support the rear portions of said beams.

5. The combination with a tractor comprising a frame, front steering and rear traction wheels supporting said frame, a motor mounted on said frame and operatively connected with said rear traction wheels to propel the tractor, and a power take-off device on the tractor adapted to be driven by said motor, of an implement attachment comprising a plurality of beams extending substantially longitudinally of the tractor, each having a part disposed on either side of said rear traction wheels, means pivotally connecting the front portions of said beams with said tractor, earth-working devices mounted on the rear portions of said beams in proximity to the position of said rear traction wheels, an attachment frame adapted for detachable mounting on the rear portion of the tractor frame, a rotatable lifting shaft supported on said attachment frame, flexible lifting member adapted for winding on said shaft and connected with the rear portions of said beams for lifting the same to transport position, and power lift means operatively connecting said power take-off device with said lifting shaft for rotating the latter.

6. An agricultural implement of the class described comprising the combination with a tractor having spaced drive wheels, of a transverse draft bar secured to the tractor, a plurality of pairs of beams connected with the draft bar and adapted to be propelled thereby, the beams of each pair so arranged as to lie on each side of a drive wheel, soil tilling tools, each connected to one pair of beams, means to effect such connection, and means to raise and lower the beams.

7. An agricultural implement of the class described comprising the combination with a tractor having spaced drive wheels, of a transverse draft bar secured to the tractor, a plurality of pairs of beams connected with the draft bar and adapted to be propelled thereby, the beams of each pair so arranged as to lie on each side of a drive wheel, soil tilling tools, each connected to one pair of beams, means to effect such connection, and means adapted to engage the ground for controlling the position of said tools.

8. An agricultural implement of the class described comprising the combination with a tractor having spaced drive wheels, of a transverse draft bar secured to the tractor, a plurality of pairs of beams connected with the draft bar and adapted to be propelled thereby, the beams of each pair so arranged as to lie on each side of a drive wheel, soil tilling tools, each connected to one pair of beams, means to effect such connection, gauge means for gauging the position of said tools relative to the ground surface, means for controlling the gauge means, and means to lift the tools from the ground.

9. An agricultural implement of the class described comprising the combination with a tractor having spaced drive wheels, of a transverse draft bar secured to the tractor, a plurality of pairs of beams connected with the draft bar and adapted to be propelled thereby, the beams of each pair so arranged as to lie on each side of a drive wheel, soil tilling tools, each connected to one pair of beams, means to effect such connection, a crank axle mounted on each of said pairs of beams, a gauge wheel journaled on each crank axle and adapted to support the tool and beams in spaced relation with the ground surface, means to rock the crank axle to gauge the operating depth of said tools, and means for lifting the beams and tools free of the ground.

10. An agricultural implement of the class described comprising the combination with a tractor having spaced drive wheels and a motor, of a transverse draft bar secured to the tractor, a plurality of pairs of beams connected with the draft bar and adapted to be propelled thereby, the beams of each pair so arranged as to lie on each side of a drive wheel, soil tilling tools, each connected to one pair of beams, means to effect such connection, a crank axle mounted on each of said pairs of beams, a gauge wheel journalled on each crank axle and adapted to support the tool and beams in spaced relation with the ground surface, means to rock the crank axle to gauge the operating depth of said tools, and means adapted to be actuated from the motor for raising and lowering the beams and tools.

11. An agricultural implement of the class described comprising the combination with a tractor having spaced drive wheels and a motor, of a transverse draft bar secured to the tractor, a plurality of pairs of beams connected with the draft bar and adapted to be propelled thereby, the beams of each pair so arranged as to lie on each side of a drive wheel, soil tilling tools, each connected to one pair of beams, means to effect such connection, a crank axle mounted on each of said pairs of beams, a gauge wheel journaled on each crank axle and adapted to support the tool and beams in spaced relation with the ground surface, means to rock the crank axle to gauge the operating depth of said tools, and means adapted to be actuated from the motor for raising and lowering the beams and tools, said last mentioned means being connected to the beams through the crank axle mounted thereon.

12. An agricultural implement of the class described comprising the combination with a tractor having spaced drive wheels and a motor, of a fixed transverse draft bar, a beam pivoted to the bar, a crank axle mounted on the beam, a gauge wheel on said crank axle, and means adapted to be actuated by the motor and including a flexible element secured to the crank axle for raising and lowering said beam.

13. An agricultural implement of the class described comprising the combination with a tractor having spaced drive wheels and a motor, of a draft bar mounted on the tractor forwardly of said wheels, a beam pivoted to the bar, a crank axle mounted on the beam, a gauge wheel on said crank axle, means adapted to be actuated by the motor and including a flexible element secured to the crank axle for raising and lowering said beam, and adjusting means for controlling the position of the gauge wheel relative to the beam.

14. An agricultural implement of the class described comprising the combination with a tractor having spaced drive wheels and a motor, of the draft bar, a pair of beams connected at their forward ends with said bar at spaced points thereon, a soil tilling tool beam, said first named beams converging rearwardly and secured to said tool beam, and means adapted to be actuated by said motor for raising and lowering said beams.

15. An agricultural implement of the class described comprising the combination with a tractor having spaced drive wheels and a motor, of a draft bar, a pair of beams connected at their forward ends with said bar at spaced points thereon, a soil tilling tool beam, said first named beams being adapted to embrace one of the drive wheels and converging rearwardly and secured to said tool beam, and means adapted to be actuated by said motor for raising and lowering said beams.

16. An agricultural implement of the class described comprising the combination with a tractor having spaced drive wheels and a motor, of a draft bar, a pair of beams connected at their forward ends with said bar at spaced points thereon, a soil tilling tool beam, said first named beams extending on opposite sides of one of the drive wheels and connected to the forward portion of the soil tilling tool beam immediately in rear of said drive wheel, said beams formed in rear of said connection to converge at a greater angle to bring their ends substantially in the plane of said tool beam, and means connecting said rear ends of the beams to the tool beam.

17. An agricultural implement of the class described comprising the combination with a tractor having spaced drive wheels, of a draft bar, a pair of beams connected at their forward ends with said bar at spaced points thereon, a soil tilling tool beam, said first named beams extending substantially rearward longitudinally of the tractor, one positioned on either side of one of the drive wheels and converging rearwardly, means connecting the longitudinally beams to the tool beam so that the latter lies between the longitudinal beams and behind the drive wheel, said means comprising a transverse member between each longitudinal beam and the tool beam and means for clamping the members to the beams, the rear ends of the longitudinal beams converging rearwardly to engage the tool beam, and means rigidly connecting said ends to the tool beam.

18. An agricultural implement of the class described comprising the combination with a tractor having spaced drive wheels and a motor, of a draft bar, a pair of beams connected at their forward ends with said bar at spaced points thereon, a soil tilling tool beam, said first named beams extending substantially rearward longitudinally of the tractor, one positioned on either side of one of the drive wheels and converging rearwardly, means connecting the longitudinal beams to the tool beam so that the latter lies between the longitudinal beams and behind the drive wheel, said means comprising a transverse member between each longitudinal beam and the tool beam and means for clamping the members to the beams, the rear ends of the longitudinal beams converging rearwardly to engage the tool beam, and means rigidly connecting said ends to the tool beam, and power connections adapted to be actuated by the motor for raising and lowering said beams.

19. An agricultural implement comprising the combination with a tractor having a motor, of a draft bar, a pair of longitudinally extending beams pivoted near one end to the draft bar, a soil tilling tool carried by the other end of said beams, a crank axle journaled on said beams the forward ends of said beams being spaced apart a distance different than the rear ends thereof, and a gauge wheel supported on the crank axle near one end thereof.

20. An agricultural implement comprising the combination with a tractor having a motor, of a draft bar, a longitudinally extending beam pivoted near one end to the draft bar, a soil tilling tool carried by said beam, a crank axle journaled on said beam, a gauge wheel supported on the crank axle near one end thereof, and power connections adapted to be actuated by the motor and connected with the other end of the beam for raising and lowering the tool, said last named means including a member journaled on one end of the crank axle and having limited rotation thereon.

21. An agricultural implement comprising the combination with a tractor having a motor, of a draft bar, a longitudinally extending beam pivoted near one end to the draft bar, a soil tilling tool carried by said beam, a crank axle journaled on said beam, a gauge wheel supported on the crank axle near one end thereof, power connections adapted to be actuated by the motor and connected with the other end of the beam for raising and lowering the tool, said last named means including a member journaled on one end of the crank axle and having limited rotation thereon, and means to adjust the operating position of the soil tilling tool.

22. In an agricultural implement, the combination with a supporting frame, of a transverse draft bar carried thereby, a soil tilling tool, a split tool carrying beam structure comprising separated parts pivoted to the draft bar and formed for connection with the tool, and means for effecting such connection.

23. In an agricultural implement, the combination with a supporting frame, of a transverse draft bar rockably carried by said frame, arms secured to said bar, a soil tilling tool, a split beam structure comprising a pair of fore and aft extending bars connected with said arms at one end and extending rearwardly in converging relation, said soil tilling tool being carried by said members adjacent their converged ends, and spring means for resisting rocking movement of said draft bar.

24. In an agricultural implement, the combination with a supporting frame, of a soil tilling tool, a split beam structure comprising a pair of fore and aft extending bars pivoted to the frame at one end and extending rearwardly in converging relation, a stub beam for the soil tilling tool, means connecting the stub beam to the bars comprising a pair of clamping members adapted to be received between said bars and having adjacent clamping faces to contact with the stub beam near one end thereof, and bolt means for securing the clamping members in engagement with the stub beam and the bars.

25. In an agricultural implement, the combination with a supporting frame, of a soil tilling tool, a split beam structure comprising a pair of fore and aft extending bars pivoted to the frame at one end and extending rearwardly in converging relation, a stub beam for the soil tilling tool, means connecting the stub beam to the bars comprising a pair of clamping members adapted to be received between said bars and having adjacent clamping faces to contact with the stub beam near one end thereof, bolt means for securing the clamping members in engagement with the stub beam and the bars, bearing brackets secured to the bars by said clamping bolt, and gauging means for the soil tilling tool including a part carried by said brackets.

26. In an agricultural implement, the combination with a supporting frame, of a soil tilling tool, a split beam structure comprising a pair of fore and aft extending bars pivoted to the frame at one end and extending rearwardly in converging relation, a stub beam for the soil tilling tool, means connecting the stub beam to the bars comprising a pair of clamping members adapted to be received between said bars and having adjacent clamping faces to contact with the stub beam near one end thereof, bolt means for securing the clamping members in engagement with the stub beam and the bars, bearing brackets secured to the bars by said clamping bolt, and means for raising and lowering said beam structure including a part carried by said brackets.

27. In an agricultural implement, the combination with a supporting frame, of a soil tilling tool, a split beam structure comprising a pair of fore and aft extending bars pivoted to the frame at one end and extending rearwardly in converging relation, a stub beam for the soil tilling tool, means connecting the stub beam to the bars comprising a pair of clamping members adapted to be received between said bars and having adjacent clamping faces to contact with the stub beam near one end thereof, and bolt means for securing the clamping members in engagement with the stub beam and the bars, said rearwardly extending bars being bent in rear of said stub beam connecting means so as to converge at a greater angle, and means connecting the rear ends of said bars to the stub beam at a point spaced from the first named connection.

28. An agricultural implement comprising a supporting frame, a draft connection, a pair of tool beams, each comprising a split beam structure including a pair of beam members spaced apart at their forward ends and pivoted to the draft connection and having soil tilling tools secured to their rearward ends, and means rigidly connecting the soil tilling tools together.

29. An agricultural implement comprising a supporting frame, a draft connection, a pair of tool beams, each comprising a split beam structure including a pair of beam members spaced apart at their forward ends and pivoted to the draft connection and having soil tilling tools secured to their rearward ends, and means rigidly connecting the soil tilling tools together, said means comprising a pair of clamping bars and angle members connected at one end to the tilling tools and at the other end to the clamping bars.

30. The combination with a tractor including front and rear wheels, of an implement attachment comprising a plurality of beams extending longitudinally of the tractor, soil engaging means on said beams directly behind said rear wheels, and yieldable hitch means connecting said beams with the tractor.

31. An agricultural implement of the class described comprising the combination with a tractor having spaced drive wheels and a motor, of a draft bar, a pair of beams connected at their forward ends with said bar at spaced points thereon, a soil tilling tool, said beams converging rearwardly, means securing said tool to the rear of said beams, and means adapted to be actuated by said motor for raising and lowering said beams.

32. An agricultural implement of the class described comprising the combination with a tractor having spaced drive wheels and a motor, of a draft bar carried by the tractor forward of said drive wheels, a pair of beams connected at their forward ends with said bar at spaced points thereon, a soil tilling tool, said beams extending on opposite sides of one of the drive wheels and connected with the soil tilling tool in rear of said drive wheel, and means connecting said rear ends of the beams with the tool.

33. An agricultural implement of the class described comprising the combination with a tractor having spaced drive wheels and a motor, of a draft bar, a pair of beams pivoted at their forward ends with said bar at spaced points thereon, a soil tilling tool, said beams extending substantially rearward longitudinally of the tractor, one positioned on either side of one of the drive wheels, means connecting the tool with and between the longitudinal beams and behind the drive wheel, said means including two transverse members between the beams and means for clamping the members to the beams, and power connections adapted to be actuated by the motor for raising and lowering said beams.

34. In an agricultural implement, the combination of a pair of longitudinally extending beams, a soil tilling tool, and means for securing said tool to and between said beams comprising two transverse members extending between the tool and the beams and means for clamping the tool and transverse members together.

35. In an agricultural implement, the combination with a source of draft, of a pair of beams extending therefrom, a soil tilling tool, means for connecting said tool with the beams comprising two transverse members extending between the tool and the beams and means for clamping the tool to said members and said members to the beams, and means for controlling the operating depth of said tool.

In witness whereof, I hereunto subscribe my name this 6th day of November, 1930.

CHARLES H. WHITE.